(12) United States Patent
Fiesinger

(10) Patent No.: US 8,239,763 B1
(45) Date of Patent: Aug. 7, 2012

(54) METHOD AND APPARATUS FOR USING ACTIVE WORD FONTS

(76) Inventor: Brooks Ryan Fiesinger, Cincinnati, OH (US)

( * ) Notice: Subject to any disclaimer, the term of this patent is extended or adjusted under 35 U.S.C. 154(b) by 884 days.

(21) Appl. No.: 12/349,581

(22) Filed: Jan. 7, 2009

(51) Int. Cl.
G06F 17/00 (2006.01)
(52) U.S. Cl. ....................................... 715/269
(58) Field of Classification Search .................. 715/256, 715/269
See application file for complete search history.

(56) References Cited

U.S. PATENT DOCUMENTS

| | | | | |
|---|---|---|---|---|
| 4,610,025 | A * | 9/1986 | Blum et al. | 382/177 |
| 5,408,594 | A * | 4/1995 | Johnson et al. | 717/122 |
| 5,432,890 | A | 7/1995 | Watanabe | |
| 5,623,593 | A | 4/1997 | Spells | |
| 5,724,596 | A | 3/1998 | Lathrop | |
| 5,768,490 | A | 6/1998 | Hersch | |
| 5,803,629 | A | 9/1998 | Neville | |
| 5,940,581 | A * | 8/1999 | Lipton | 358/1.11 |
| 5,949,435 | A | 9/1999 | Brock | |
| 6,157,390 | A * | 12/2000 | Cheng | 345/467 |
| 6,624,814 | B1 | 9/2003 | Karow | |
| 6,829,748 | B1 | 12/2004 | Browne | |
| 6,901,427 | B2 * | 5/2005 | Teshima | 709/203 |
| 7,184,046 | B1 * | 2/2007 | Hawkins | 345/468 |
| 7,289,123 | B2 | 10/2007 | Duggan | |
| 7,620,650 | B2 * | 11/2009 | Ornstein et al. | 1/1 |
| 7,668,718 | B2 * | 2/2010 | Kahn et al. | 704/270 |
| 7,827,483 | B2 * | 11/2010 | Unbedacht et al. | 715/256 |
| 2002/0010723 | A1 * | 1/2002 | Nielsen | 707/529 |
| 2002/0099867 | A1 * | 7/2002 | Wilkinson et al. | 709/315 |
| 2004/0205677 | A1 * | 10/2004 | Hughes et al. | 715/542 |
| 2005/0216836 | A1 * | 9/2005 | Duke et al. | 715/531 |
| 2005/0268221 | A1 * | 12/2005 | Shur et al. | 715/513 |
| 2006/0017733 | A1 * | 1/2006 | Matskewich et al. | 345/467 |
| 2006/0072136 | A1 * | 4/2006 | Hodder et al. | 358/1.11 |
| 2006/0194181 | A1 * | 8/2006 | Rosenberg | 434/317 |
| 2006/0232588 | A1 | 10/2006 | Opstad | |
| 2007/0016874 | A1 | 1/2007 | Chaudhri | |
| 2007/0100877 | A1 * | 5/2007 | Paoli et al. | 707/102 |
| 2007/0139412 | A1 | 6/2007 | Stamm | |
| 2007/0218430 | A1 * | 9/2007 | Chang et al. | 434/155 |
| 2007/0226641 | A1 | 9/2007 | Johnson | |
| 2007/0288844 | A1 | 12/2007 | Zingher | |
| 2008/0028304 | A1 | 1/2008 | Levantovsky | |

(Continued)

OTHER PUBLICATIONS

Microsoft Typography, ClearType Information; by Bill Hill; 1998—Microsoft Corporation.

(Continued)

*Primary Examiner* — Laurie Ries
(74) *Attorney, Agent, or Firm* — Frederick H. Gribbell

(57) ABSTRACT

A method of defining and displaying letters of words on a computer platform is provided, so that words of text can be more quickly and accurately read by a person. A plurality of subfonts are used to define character sets to be displayed on a monitor screen, in which the subfonts make words more legible and faster to read. A font designer may design a variety of different subfonts for various characters of a font set, and can define which subfonts are to be used to display individual characters of words, depending upon the position of characters within a word, and depending upon the number of characters of that word. The font designer can select, from a plurality of subfonts, individual styles for letters of various words that are all defined within a same font set, which itself can comprise many different styles of existing or new font types.

18 Claims, 5 Drawing Sheets

U.S. PATENT DOCUMENTS

2009/0307585 A1* 12/2009 Tranchant et al. ............ 715/269
2010/0042916 A1* 2/2010 Greenfield et al. ........... 715/251
2010/0107062 A1* 4/2010 Bacus et al. .................. 715/269

OTHER PUBLICATIONS

About.com, "Desktop Publishing"; by Jacci Howard Bear; 2007.
Word Recognition Skills and Strategies; author unknown; 1997—Houghton Mifflin Company.
Microsoft Typography, What is Clear Type?; author unknown; Jan. 16, 2002—Microsoft Corporation.
The Next Big Thing in Online Type; by Anne Van Wagener; Mar. 7, 2005—The Poynter Institute.
"Eye Movements, Perceptual Span, and Reading Disability", Annals of Dyslexia, vol. 33, pp. 163-173, 1983—The Orton Dyslexia Society.
Visual Acuity; by Michael Kalloniatis and Charles Luu; (before 2007)—webvision.med.utah.edu.
The Magic of Reading; by Bill Hill; Apr. 27, 1999—Microsoft Corporation.
Webopedia, definition of "font", by Web Media Brands; 2007—Web Media Brands Inc.
Literature Review, "Which are More Legible; Serif or Sans Serif Typefaces?"; by Alex Poole; Apr. 7, 2005.
The Psychology of Reading; by Keith Raynor et al.; pp. 76-81, 108-111, 114-115, 154-159, 184-187; Nov. 1, 1994.

* cited by examiner

METHOD AND APPARATUS FOR USING ACTIVE WORD FONTS

BACKGROUND OF THE INVENTION

1. Field of the Invention

The present invention relates to computer equipment, and, more particularly, to a method and apparatus that allows humans to read displayed or printed text more quickly and easily. The invention is disclosed as a method of defining and displaying or printing words on a computer platform in an improved manner, so that sentences of words can be more quickly and accurately read by a person. A processing platform with a "subfont designer" computer program is provided in which a plurality of subfonts are used to define character sets for words to be displayed on a monitor screen, in which the various subfonts make the words more legible and faster to read either on the display, or on a printed hard copy. The computer program allows a font designer to select, from a plurality of various subfonts, individual styles for letters of words that are all defined within a same font set, and will later be used in displaying or printing words using those subfonts. The selected subfont depends on the position of characters within a word, and also depends upon the number of characters in that word. The font designer also may design a variety of entirely new subfonts for various characters of a font set, and again can define which subfonts are to be used in displaying or printing words, depending upon the position of characters within a word, and depending upon the number of characters of that word. The font designer may also manually define certain words for an "exception list."

The invention also provides an "add-in logic" computer program that processes words of text, and automatically selects an appropriate subfont for each character of each word, according to the add-in logic processing rules. The selected subfonts will be generated according to the position of characters in a word, and according to the number of characters in the word, or will find the word in the "exception list" that was previously defined at the "subfont designer" stage.

2. Description of the Related Art

Readability: What makes text easy to read and how is it read?

There has been little change in the typography world in recent years. Although new fonts are developed every day, there has not been a big revolution, in terms of readability. Microsoft unveiled ClearType™ in late 1998 which aids in readability; however, almost ten (10) years have passed without anything new. Now, more than ever, the world is focusing on readability as people are spending more time reading on computer screens, but at the same time still relying on easy readability for printed text. There are major differences between reading on a screen and reading printed text.

Typeface:

There are many different bits and pieces that make up typeface. One does not necessarily need to know all of the names and definitions, but they may be of interest when choosing which font to use.

First, there are "strokes." Jacci Howard Bear, of About.com states that strokes are "the main diagonal portion of a letterform such as in N, M, or Y." This would be the slant of the letter making a stroke. Studying further, there are several types of strokes that make up characters. One type of stroke is a "stem." The stem is generally the vertical line in a character. There may be two stems in some cases, such as the letter M, but some characters may not have a stem, such as the letter C. Looking at the letter A, it can be seen there is no vertical line for a stem; however, both slanted lines would be considered the stem (Bear, Stem).

The next type of stroke is called an "extender." Extenders are known as both ascenders and descenders, going both above the x-height and below the baseline respectively. Examples of these letters would include p, l, y, and k.

An "arm" is another type of stroke. Arms are seen on letters such as F and T. Bear notes "the arm of a letter is the horizontal stroke on some characters that does not connect a stroke or stem at one or both ends." Many people recognize arms as the lines which stick out from the letters. The letter K has an arm as well although it points upward instead of horizontally (Bear, Arms). "Crossbars" and "cross strokes" are both different than arms, but are part of the same idea. An example of a cross stroke would be the horizontal line of a lower case f, while an example of a crossbar would be an uppercase A, as it connects the strokes together (Bear, Crossbar). A crossbar connects one side of a letter to the other while a cross stroke does not.

"Tails" are known to be located on both capital and lower case characters. Often, on lower case letters, the descender is also called a tail. This is true for letters such as g and y. With capital letters, according to Bear, a "decorative stroke" is generally seen on a Q, as well as an R. Used interchangeably with a tail is a "leg." A leg is the downward sloping line which extends towards, or even below, the baseline. Again, a Q and R can be said to have a leg.

Rounding out the array of strokes is a "bowl." When imagining a bowl, the general populations would tend to think of a round or circular shape. This is the same with a bowl in terms of typeface as well. A bowl is the curved circular portion of a letter. For example, the letters a, d, O, and P all have a bowl.

The next section of typeface is the "counter." The counter is the white space which appears around a curve or inside a letter. A variety of letters with prominent counter space include p, s, D, and B. The negative space does not just include the area inside a bowl, but also the area around a curved letter. These partially enclosed spaces are known as the "aperture." Two common letters exhibiting aperture are m and h (Bear). Looking further, the letters C and u also have an open negative space. Finally, the space inside the lower case e has a unique name called the "eye." This name is specific to the lower case e, as no other characters possess this same design.

There are also two other typeface designs exclusive to a certain letter. The first one is an "ear." The ear is typically found on a lower case g, on the upper right side. Depending on the way a designer builds the g, this ear can make the font very original. Second, is the "chin." Still working with the letter g, the chin relates to a capital G. Bear defines the chin as the "right angled stroke," which meets with the vertical downward spur.

Moving further into the anatomy of typeface, "serifs" are the extra lines, or strokes, found at both the top and bottom of several letters. There are many fonts which include serifs as part of their typeface, while many other fonts do not. The appearance of serifs depends solely upon the designer of the typeface, as there are a variety of different characteristics to choose from. Depending upon the intended use of the font, a hairline, square, or wedge serif may be chosen. From here, it is then decided upon whether to use a "bracketed" or "unbracketed" type of serif.

Looking at a bracketed serif, there is an obvious curve linking the serif to the stem, some being very light while others are heavy and more defined. "Beaks" and "spurs" look like serifs, but are both different. Beaks are more ornamental and distinct than normal serifs. Spurs are also located at the end of a letter like a beak and serif, but have a more defined rounded edge as opposed to a pointed, sharper edge which is typically present on a serif character.

Size:

Every document should be created with a target audience in mind. After determining who the target audience is, an appropriate, readable font should be chosen and then its size should be established. Unlike some products, one size does not fit all in terms of font size. Matching font size to specific age groups aids in readability. Larger font sizes are ideal for younger and older audiences and small fonts should be avoided. A font between the point size of 10 to 12 is generally appropriate for most adult audiences and proficient readers, while children and beginning readers benefit from an average of 14. The term point measures the height of characters in a font, "each point being approximately 1/72 inch" (Wepopedia.com, 2004). Further, one must be aware of the differences in font size despite the same point size. Certain fonts may have a 12 point size, but be extensively larger than other fonts also measuring 12 point. It is necessary to take this into consideration and compare fonts and sizes before making a final decision. According to Bear, it is also important to pay attention to large blocks of text and be sure the reader will not tire easily from extensive reading.

Font:

The most recent readability development by Microsoft is ClearType™. This technology increases the resolution of the text by essentially blurring the edges to make the font appear more clearly on screen. With added resolution, the sharpness of the type is enhanced, in turn making the text more readable, particularly over long periods of time. Microsoft researched this new method of readability for two (2) years before coming to the conclusion "that reading is a form of pattern recognition." Further, researchers for Microsoft agreed all factors including the shape and spacing must collectively work together to give words a recognized pattern. This product was first developed and marketed to ebook readers and others who used small handheld devices for daily reading. It was not until later that Microsoft introduced the product to computers for common, everyday use (Microsoft, 2002).

A study performed by Ascender Corporation in 2004 found the following fonts to be the most widely used on the front cover of newspapers. There were nearly one hundred (100) newspapers involved in this study and ten (10) appear to have emerged as the top. In order of popularity, the typeface families include Poynter, Helvetica, Franklin Gothic, Times, Utopia, Nimrod, Century Old Style, Interstate, Bureau Grotesque, and Miller. This study analyzed print (hard copy) versions of newspapers, as it is known print and online editions are not necessarily the same font.

Serif vs. Sans Serif:

It has been noted that fonts composed of rounded corners create a more effortless reading experience (Van Wagener, 2005). The rounded corners allow the readers' eyes to flow more easily from one word to the next. However, serif fonts also create a definite direction which "helps to lead the eye along the horizontal path that makes for effortless recognition of successive 'patterns' of words" (Hill, 1999).

Examples of Serif: Times, Rockwell, Courier, Bodoni, Century Schoolbook

Examples of Sans Serif: Arial, Helvetica, Verdana, Futura, Franklin Gothic

Word, Letter, Line Spacing, and Line Length:

When letters, words, and sentences are packed together tightly, the ease of reading becomes more difficult and harder to comprehend. "Kerning" and "tracking" are two typographical terms often confused with each other, but both help to increase and decrease the space between type. Line spacing is known as leading.

"Kerning" is the adjustment of space between pairs of characters to make for a more readable text. Often, when two characters are placed next to each other, there is extra unnecessary space which can be reduced by kerning. For example, if one were to look at the letters AV without kerning, it would be seen as AV. With kerning, the letters would become closer together, appearing as AV. This is often used with larger fonts, 18 points and higher. Further kerning can be used to increase the amount of space between two characters and is generally used with accented letters.

Letter spacing in text should follow a general set of rules according to Bill Hill, Microsoft researcher and author of "The Magic of Reading." He suggests letters should be spaced as tight as possible, ensuring the best reading opportunity. Moreover, studies have shown the wider apart letters are, the more difficult it is to interpret. Finally, he suggests letter spacing should remain constant throughout the entire text passage as successful reading relies greatly on pattern recognition. It is important to have more space between words than between letters. Creating a defined space at the end of each word allows the eyes to see and the brain to process the ending of one word and beginning of another.

"Tracking" adds an even amount of space to a whole block of text or group of words instead of specific letters, as kerning does. While kerning fixes improper spacing between letters, tracking has the ability to change the whole appeal of the text. It can alter a selection of text in order to keep the text on the same page or line.

"Leading," often known as line spacing, is the space between lines of text. It is normally measured in points, just as type, and is measured from baseline to baseline. About.com Guide Jacci Howard Bear suggests adding two (2) points to the point size of your text for a general starting point to adjust line spacing. It is important to have the lines of text spaced well to maximize readability. In addition to space between lines, consistency of the line length is an important issue to address. People tend to recognize and rely on patterns (line length proving to be a great example). If readers can predict when their eye is to move from the end of one line to the beginning of the next, they are able to more easily flow through the whole text. An abrupt line ending causes the eye and brain to be disrupted, unnecessarily setting back the overall reading rate. It is ideal to ensure all text lines are about the same length, which tends to be between ten and fourteen words.

How Learning to Read is Accomplished:

When learning to read, the typical process is to recognize letters and put each of them together to decipher, and then read, a word. Through repeated exposure, the reader's brain develops and recognizes the basic pattern of letters. Expanding, the reader begins to notice the whole word and then patterns of words. After this pattern is comprehended, it is noted as a "gestalt" (Hill, 1999). The term, gestalt, is defined as "unified whole" and refers to the tendency most people have to organize things they see into groups, or unified wholes (The Gestalt Principles). In more recent years, it has been suggested learning in a "letter-then-word" manner is a more effective strategy. This style of learning is in line with how the Chinese learn, as each character in their language is a word or phrase (Hill, 1999). The Chinese learn words and phrases before going back to examine what is comprised of each. Neither style of learning to read has been proven to be better, but more recently, Hill suggests teaching reading has shifted more attention to whole words instead of letters. It is necessary to take both ideas into consideration as a justifiable point is made by Taylor and Taylor, noting that although the idea has shifted more towards learning whole words, then letters, many readers do not ever advance beyond the letter recognition stage. It is agreed that weaker readers may always have to identify letters before recognizing a word and even more advanced readers may have to revert back to letter and word-part recognition when a complex word greets them.

There are many subliminal processes that take effect when reading; however, word recognition is known as the principal process. Most people remember learning to read and recognize words. "A mere one hundred words make up a full fifty percent of the words read, even by adults," according to leading textbook publisher Houghton Mifflin, through Edu-Place.com. These high frequency words are learned and memorized due to their repetitive nature in everyday text and speech. One can look at word recognition as taking a "walk through a friendly neighborhood park, where almost all of the people met are old friends whom are recognized immediately" (Hill, 1999). These "people" recognized immediately are equal to the common words seen and comprehended everyday. Now, still in the park, if someone new is seen, they may be befriended and remembered in the future, just as with a new word, one tends to use a dictionary to define and store it in memory. "Memory is the key to reading, from the simple mundane act of recognizing a single letter, to comprehending a whole sentence or passage of text" (Taylor & Taylor, 1983). Much research has been completed on whether or not long-term or short-term memory takes a bigger role in reading, but all agree pattern recognition is key. There is not a definite answer on how people process pattern recognition, whether it be by individual letters, words, groups of words, or phrases, but upon seeing text, the brain recognizes a pattern and then mentally interprets it (Hill, 1999).

When reading, people subconsciously use two different types of eye motions, "saccades" and "fixations." Louis Emile Javal, a late French ophthalmologist is responsible for coining the word saccade as well as for completing much of the research on eye movement while reading.

"Saccades," according to Merriam-Webster, are "small rapid jerky movements of the eye." Saccades take the eyes from one group of text to the next, being the path the eye follows between fixations. "Fixations" are known as brief pauses of the eye during the saccades. During a fixation is when information being read begins to be processed. Early readers generally tend to fixate on each word individually while more experienced readers learn to fixate on a single word and take in the words to the left and right of the fixation point. By focusing in the center of a few words, the eyes make fewer fixations; therefore, the reader flows through the text more quickly. Javal's findings helped determine the average fixation duration at 200-250 milliseconds, while the extremes span from 100 to 500 milliseconds (Rayner, 1983). The average saccade length is 100 milliseconds, half of an average fixation length. With these durations known, conclusions can be drawn that is more efficient for readers to have longer saccade lengths with shorter fixation durations. With longer saccades, adept readers read through more text in a shorter amount of time. They are able to have longer saccades with fewer fixations. Less experienced readers tend to have shorter saccades with longer fixations which result in longer reading times, as fixations generally last twice as long as a saccade. Readers in this category are more likely to be reading almost every word individually instead of focusing on one word while expanding their sight to also see words to the right and left, as the more experienced readers would. Further research on this topic is underway as there is still much unknown in terms of how the eye works in regard to reading.

What is needed in the art is a more readable font for use on computer displays, which are in use more and more. Many persons spend almost their entire working days viewing such computer displays, and much of the data being displayed is in text form (i.e., words and/or numbers).

What is also needed in the art is a more readable font for use as printed text. Again, many persons spend almost their entire working days reading hard copy printed materials, and much of that information is in text form (i.e., words and/or numbers).

SUMMARY OF THE INVENTION

Accordingly, it is an advantage of the present invention to provide a processing platform in which a plurality of subfonts are used to define character sets for words to be displayed on a computer platform, in which the subfonts make the words more legible and faster to read.

It is another advantage of the present invention to provide an Active Word Font executable computer program in which a font designer can select, from a plurality of subfonts, individual styles for letters of various words that are all defined within a same font set, and will later be used in displaying words using those subfonts, in which the selected subfont depends on the position of characters within a word, and also depends upon the number of characters in that word.

It is a further advantage of the present invention to provide an Active Word Font executable computer program in which a font designer can utilize new font styles to be later used as part or all of a plurality of subfonts, which will later be used/selected for displaying words using those subfonts, in which the selected subfont depends on the position of characters within a word, and also depends upon the number of characters in that word. It is yet another advantage of the present invention to provide an Active Word Font executable computer program that allows a font designer, or an automatic font selection system, to define a plurality of different subfonts for various characters of a font set, and the appropriate subfonts will be later selected to make up a word, such selection depending upon the position of the characters within the word, and also depending upon the number of characters of that word.

It is still another advantage of the present invention to provide multiple subfonts for a particular style of font used in a computer platform that displays characters on a monitor screen, and which allows a font designer to manually define certain words on an "exception list," or to define subfonts for various positions of characters in words that will later be automatically selected by an Active Word Font executable program.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for using a plurality of subfonts to represent verbal characters is provided, in which the method comprises the following steps: (a) providing a processing circuit with a memory circuit; (b) providing at least one input device interfaced with the processing circuit; (c) providing at least one output device interfaced with the processing circuit; (d) determining a plurality of subfont styles and sizes, for use in defining a first active word font set; (e) selecting a desired subfont for each character of a plurality of word types having various word sizes, in which a "word size" comprises a number of characters of a word, by: (i) assigning, for a first word size, from the plurality of subfont styles and sizes, a desired subfont style and size for each character position within the first word size; (ii) assigning, for a second word size, from the plurality of subfont styles and sizes, a desired subfont style and size for each character position within the second word size; (iii) continuing the subfont style and size assigning functions for additional word sizes, until reaching a predetermined maximum word size; wherein a first at least one of the subfont type and size of a first character position is different from a second at least one of the subfont type and size of a second character position for at least one of the first, second, and additional word sizes; and (e) storing the assigned subfont styles and sizes for each of the plurality of word types in the memory circuit as the first active word font set, for later retrieval.

In accordance with another aspect of the present invention, a method for retrieving a plurality of subfonts that represent verbal characters for use with text data is provided, in which the method comprises the following steps: (a) providing a processing circuit with a memory circuit; (b) providing at least one input device interfaced with the processing circuit; (c) providing at least one output device interfaced with the processing circuit; (d) providing an active word font set that includes: (i) a plurality of predetermined word types of various word sizes, in which a "word size" comprises a number of characters of a word; (ii) a plurality of previously-assigned subfont styles and sizes for each of the plurality of word types; (e) receiving input text data to be formatted using the active word font set, wherein the input text data includes a plurality of words having verbal characters; and (f) analyzing each of the plurality of words of the input text data received in step (e), by determining if each of the input words matches one of the word types, and: (i) if not, then performing no formatting on that input word; (ii) if so, then formatting each character of that input word, by: (A) determining a word size of the input word, and retrieving a corresponding set of the plurality of previously-assigned subfont styles and sizes for that word size; and (B) formatting each character of the input word, based upon a character position within the input word, and using the corresponding set of the plurality of previously-assigned subfont styles and sizes for that character position in the corresponding word size; wherein a first at least one of the subfont type and size of a first character position is different from a second at least one of the subfont type and size of a second character position for at least one of the plurality of words of the input text data.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The above-mentioned and other features and advantages of this invention, and the manner of attaining them, will become more apparent and the invention will be better understood by reference to the following description of at least one embodiment of the invention taken in conjunction with the accompanying drawings. The accompanying drawings incorporated in and forming a part of the specification illustrate several aspects of the present invention, and together with the description and claims serve to explain the principles of the invention. In the drawings:

DETAILED DESCRIPTION OF THE INVENTION

Figure 1A:
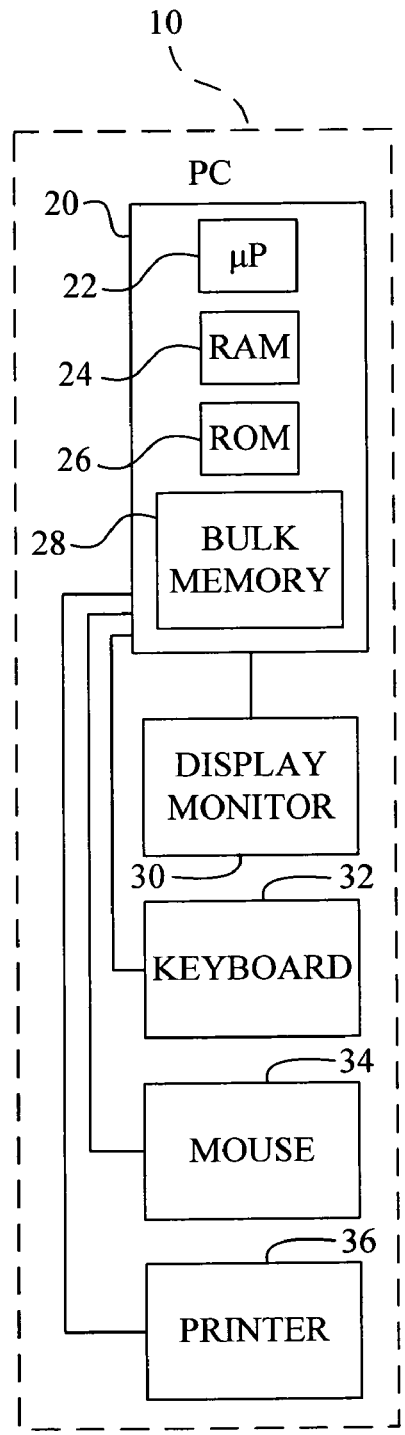
FIG. 1A is a block diagram of the major components of a personal computer system, as used according to the principles of the present invention.

Reference will now be made in detail to the present preferred embodiment of the invention, an example of which is illustrated in the accompanying drawings, wherein like numerals indicate the same elements throughout the views. The exemplifications set out herein illustrates at least one preferred embodiment of the invention, in at least one form, and such exemplifications are not to be construed as limiting the scope of the invention in any manner.

The terms "first" and "second" preceding an element name, e.g., first letter, second letter, etc., are used for identification purposes to distinguish between similar or related elements, results or concepts, and are not always intended to necessarily imply order, nor are the terms "first" and "second" intended to preclude the inclusion of additional similar or related elements, results or concepts, unless otherwise indicated.

Reference will now be made in detail to the present preferred embodiment(s) of the invention, an example of which is illustrated in the accompanying drawings, wherein like numerals indicate the same elements throughout the views.

The present invention is generally used with computers that use fonts in word processors and in other character-displaying software for computer systems. As noted above in the Background, there are many existing font sets, including commonly-known fonts such as "Times New Roman" and "Courier," and in some circumstances the letters of a particular font do not read so easily when used in a particular word that connects two letters together in a way that is not so easy (or quick) to read.

The present invention enables generation of new font sets and the invention will automatically select a particular subfont for a specific verbal character in a given word. A font designer/developer (typically a human being who works as either a software designer or, more specifically, an image designer for generating bitmaps or vector images for characters as part of an alphabet of characters) is able to use the features of the present invention to automatically or manually select a particular subfont for each character of a particular word of a specific language, such as the English language. One major purpose for using the present invention is to make words more readable, and a feature of the present invention allows different subfonts to be used for various characters of the same word. These subfonts can be selected manually for predetermined words by a font designer, or the subfonts can be selected automatically by the executable software used with the present invention.

It will be understood that the term "font designer" and the term "font developer" essentially are referring to the same person, i.e., someone who defines the subfonts used in the present invention. This font designer/developer does so either by creating entirely new font styles, or by select existing font styles, or using a combination of new and "old" (existing) font styles for defining the subfonts for a particular font set, as discussed below in detail. This person will generally be referred to herein as a "font designer," although other terminology certainly could be used for this person's function.

It will also be understood that the terms "character", "letter", and "verbal character" all represent essentially the same concept, i.e., a particular visual shape that is either displayed or printed, and which makes up part of a word of a written language. Each such character is typically used to create a "character set," in which the character set comprises the entire variety of individual characters that make of the particular written language (e.g., the letters "A" through "Z" and "a" through "z" for the English language). It should be noted that other alphanumeric characters are commonly included as part of a particular "character set" when printed or displayed, certainly including the well-known ASCII character set.

It will be further understood that the term "subfont" generally represents a specific size and shape of at least one character of a written language. For example, if a character set includes A-Z and a-z (for the English language), and if a font type known as "Courier" is to be used for printing or displaying verbal characters for at least a portion of a specified set of subfonts, then a first subfont for the letter "A" could be 10-point Courier, a second subfont for the letter "A" could be 11-point Courier, a third subfont for the letter "A" could be 12-point Courier, and so on. Moreover, a fourth subfont for the letter "A" could be a 12-point rendition that has an entirely different appearance than a "Courier"-type font style, such as Times New Roman, or an entirely new font style that has never been created before. This fourth subfont for the letter "A" could still be part of the same set of subfonts that also include the above-defined first, second, and third subfonts that have the appearance of a Courier-type font style. The present invention is capable of combining many different font styles into a single set of subfonts, as desired by the font developer/designer. Examples of this are provided, below. In general, subfonts are derived from artificially-created printed fonts, artificially-created script fonts, and handwriting. It should be noted that, in this written description, a subfont is sometimes also referred to as a "font," particularly in the examples that refer to the flow charts.

In a preferred mode of the present invention, the executable software analyzes each word that is to be used in a character set (such as use with a word processor) and the present invention has a feature referred to as an "active word font" in which the executable software assigns a subfont to each letter of a word. This assignment of a subfont for each letter depends on the type of letter and also depends upon its placement within the word, and the desired result is a more readable font for that particular word, to increase legibility and reading speed. The present invention can be used with a completely new set of fonts, or it could also be used with traditional fonts that conventional computers currently can generate, or can read, using optical character recognition software, for example. If traditional fonts are used with the present invention, these fonts would be accessed as subfonts within a particular active word font (AWF) set that already uses a traditional type of font (such as Times New Roman or Courier, for example). The use of subfonts allows for each word to have a particular word font (or subfont) per character in that word, as determined by the font designer, and as selected by the software, either automatically, or manually (i.e., previously selected by the font designer).

A description of the control logic used with the present invention, and also some examples will aid in understanding the present invention. Referring now to FIG. 1, a block diagram of the main system components is provided, in which a personal computer (as an exemplary computing device) is generally designated by the reference numeral 10.

FIG. 1A illustrates a block diagram of a typical computerized system that can implement the present invention, generally designated by the reference numeral 5. A human user can operate a workstation or personal computer, generally designated by the reference numeral 10, and referred to on FIG. 1A as "PC".

Typical equipment within PC 10 would be a physical (or virtual) personal computer, generally designated by the reference numeral 20. Within a physical personal computer 20 would typically be a microprocessor 22, Random Access Memory (RAM) 24, Read Only Memory (ROM) 26, and a bulk memory device 28, such as a hard disk drive or an optical disc drive. The workstation or PC station 10 typically would also include a display monitor 30, a keyboard 32, a mouse 34, and perhaps a printer 36. Therefore, the PC 10 includes a processing circuit (22), a memory circuit (24, 26, 28), at least one input device (32, 34), and at least one output device (30, 36). It will be understood that there are many types of input devices and output devices that can be used in the present invention; for example, the mouse 34 could be any type of cursor position pointing device (such as those found on laptop computers), and the keyboard 32 could be a full-size "standard" QWERTY keyboard, or an equivalent smaller device that requires a pencil-sized actuator used to press against very small membrane switches. The keyboard would not necessarily require a full alphabet of characters, although that full alphabet feature is desirable. Likewise, the display monitor 30 could be an older-style cathode ray tube device or a new flat panel display, either of which could be monochrome in nature or a full-color display device.

In an organization, such as a company with many employees, a typical computer system could include multiple personal computers (or workstations) that each have access to information stored in a database or other form of mass memory, and such mass memory device would typically be accessible over a network. As depicted on FIG. 1B, a network server 90 is used to communicate over a network 55 to a first PC at reference numeral 60, also referred to in FIG. 1B as PC#1.

Figure 1B:
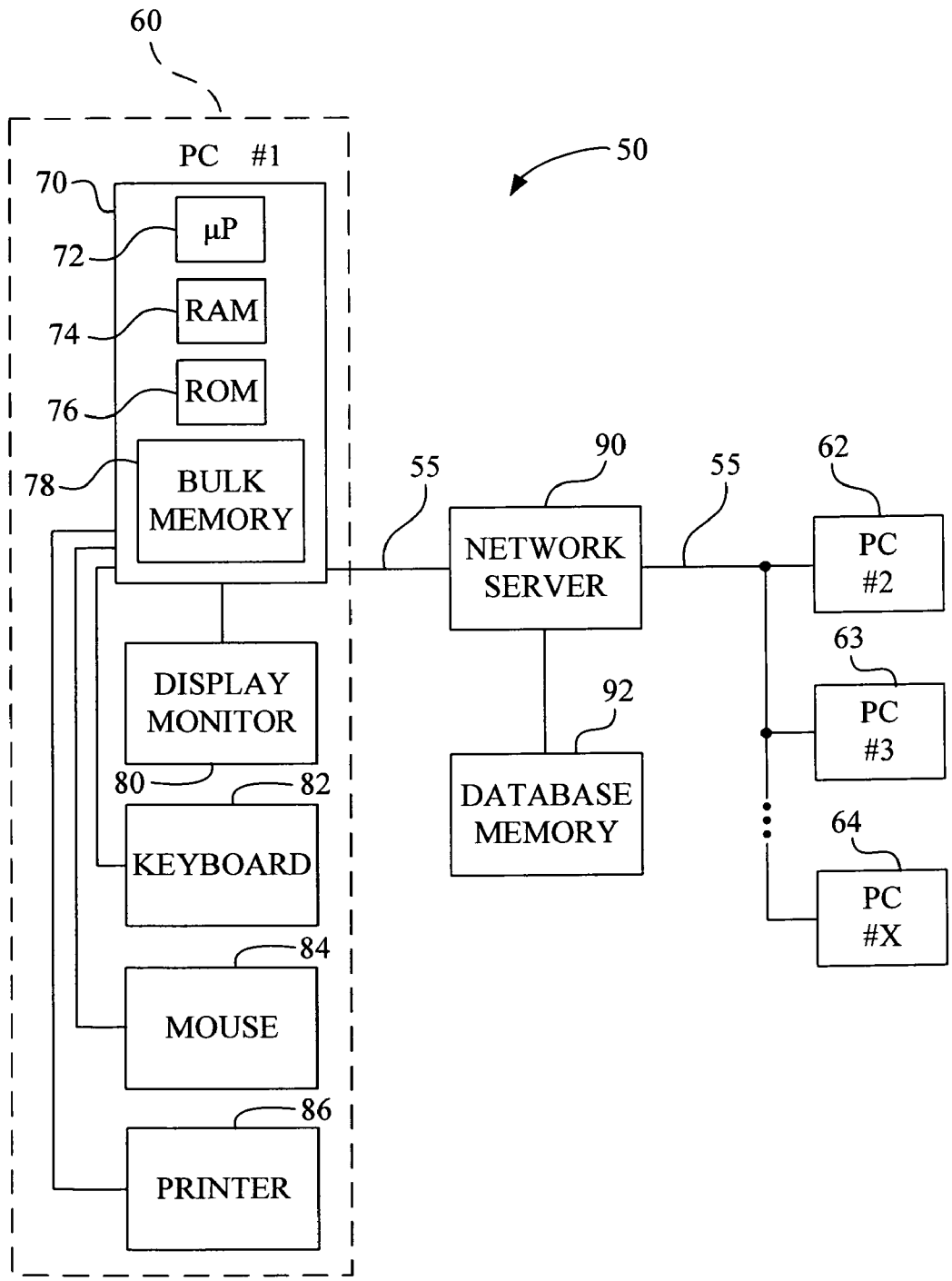
FIG. 1B is a block diagram of the major components of a networked computer system, as used according to the principles of the present invention, in which there are multiple computers tied into a central memory server.

As in FIG. 1A, typical equipment within PC#1 would be a physical (or virtual) personal computer, generally designated by the reference numeral 70 on FIG. 1B. Within a physical personal computer 70 would typically be a microprocessor 72, Random Access Memory (RAM) 74, Read Only Memory (ROM) 76, and a bulk memory device 78, such as a hard disk drive or an optical disc drive. The workstation or PC station 60 would typically also include a display monitor 80, a keyboard 82, a mouse 84, and perhaps a printer 86.

The same network 55 can also be used to communicate to other workstations or personal computers, in situations where other font designers or network users are allowed to access some or all of the information/data used in the present invention. The network server 90 may include some type of bulk memory storage devices, and would typically include or communicate with a mass memory device at 92 that stores most or all of the font sets and other numeric and text information used in the present invention. In this manner, all of the PCs or workstations could access the database memory 92, via the network server 90.

Note that the network 55 could comprise, at least in part, the INTERNET; in that instance, network server 90 could act as an Internet Service Provider (ISP) to allow "external" communications to and from the mass memory device 92. As an alternative (or in addition to), there could be several other ISP's located around network 55 as well, perhaps one ISP for each of the PC's or workstations (or one ISP per physical grouping thereof) that are connected to network 55. Such communications might be encrypted, particularly if a relatively non-secure network of computers is actually used (such as the INTERNET).

The other PCs are designated at reference numerals 62, 63, and 64. As is made clear on FIG. 1B, there can be any number of such PCs or workstations, from PC#1 through PC#X. The only true limitation is the amount of physical processing and memory hardware, and the network server software and hardware connections.

Figure 2:
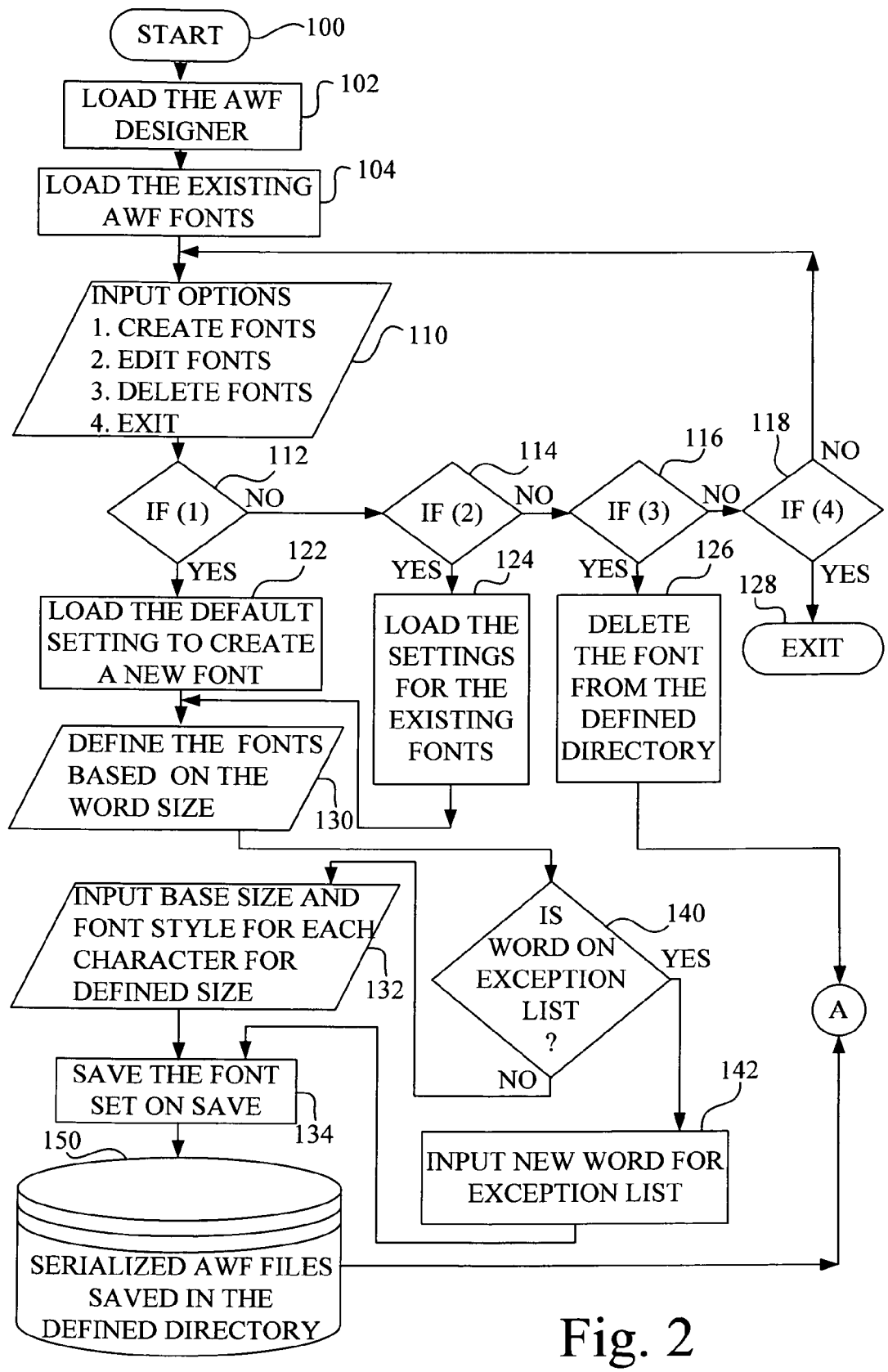
FIG. 2 is a flow chart of the steps used by a font designer/developer to create new subfonts to be used as part of a font set, according to the principles of the present invention.

Referring now to FIG. 2, a description is provided of the control logic used in the executable software that a "font designer" is able to work with when using the principles of the present invention. Beginning with a "START" step at reference numeral 100, the first executable step is to load the "AWF Designer" routine at a step 102. This AWF Designer routine comprises executable software that can run on a personal computer, such as a WINDOWS platform or a MACINTOSH platform, for example. As the AWF Designer routine begins to execute, a WINDOWS-type screen (i.e., a graphics user interface, or "GUI") will be displayed on monitor ZZ1, and the top display bar can have a name such as "Active Word Fonts Developer Home." Within this screen, there will be an open panel for a first subfont, and at this stage, the designer can select a new font set, delete an existing font set, or edit a font set that has been previously stored. The font set can be saved by the AWF software as a particular name for that font set. For example, the font set name could be "FIES1" or "FIES2." Each of these particular commands can be selected by clicking the cursor or mouse pointer on the overall "window" for the Active Word Fonts Developer Home control panel, in which each of these commands is displayed as a "hot button" at a particular location or placement within the control panel screen. Other active buttons could have different commands, such as "Add New Font Style," or "Delete Selected Font Style," or "New Word Size," or "Delete Word Size." There could also be other active buttons for standard commands such as "Save," "Exit," or "Help."

Once the AWF Designer routine has been loaded onto the computer platform at step 102, a step 104 will load the existing AWF fonts that have already been created on this platform. If any previous subfonts have been stored on the platform, they will automatically be loaded at this step.

The next step displays the main input options available to the font designer (i.e., the human user of this computer program). Some of the standard input options are: (1) "Create Fonts", (2) "Edit Fonts", (3) "Delete Fonts", and (4) "Exit". At this point in the control logic, the display screen on monitor ZZ1 will have a different appearance, such as that depicted in FIG. 4. The first option for creating new fonts could have a control button titled "New Font Set," while the second button for editing fonts could have a control button titled "Edit Font Set" with the name of that font set as part of the image for that button on the GUI screen, and the third choice of deleting fonts could have a control button titled "Delete Font Set." These choices are depicted in the logic flow of FIG. 2, discussed below.

After the input options are displayed at step 110, the font designer now has four main choices, which are characterized on the flow chart of FIG. 2 by decision steps 112, 114, 116, and 118. If Choice #1 is selected (i.e., for "Create Fonts"), then decision step 112 will have a YES result, and the logic flow will be directed to a step 122. On the other hand, if Choice #2 is created (i.e., "Edit Fonts"), then step 112 will have a NO result while decision step 114 will have a YES result, and the logic flow is directed to a step 124. If the third choice of "Delete Fonts" is selected, then steps 112 and 114 will both have a NO result while decision step 116 will have a YES result, directing the logic flow to a step 126. Finally, if the "Exit" function is selected, then steps 112, 114, and 116 will all have NO results while decision step 118 will have a YES result, and the logic flow is directed to a step 128, at which time this software routine will exit, and the computer will go back to its WINDOWS-type "desktop" (or GUI) screen.

If Choice #3 was selected, then step 126 will delete the font that was indicated on the screen from the defined directory. The logic flow will then be directed to a step "A", which also appears on the flow chart of FIG. 3.

If Choices #1 or #2 were selected, then their particular functions will be executed, before continuing on with further steps indicated on FIG. 2. If Choice #2 (Edit Fonts) was selected, then a step 124 will load the settings for existing fonts that have previously been stored on this platform. The logic flow is then directed to a step 130 which will be discussed below. On the other hand, if Choice #1 (Create Fonts) was selected, then a step 122 loads the default settings to create a new font set. The logic flow then is directed to step 130, discussed below.

In step 122, the font designer will have the ability to edit the settings for creating new subfonts. In this step, the font designer can literally create a particular size and shape for a character that will be part of the font set. For example, if the font designer desires to create an upper case letter "S" as a new shape, or perhaps an appearance similar to a Times New Roman font, then the font designer can now create such a letter by specifying a specific bitmap or vector image for that letter. If the font designer desires to create a lower case "s," and that lower case "s" is to have a new shape, or perhaps an appearance similar to a Times New Roman character, the font designer can create the exact bitmap (or vector image) for that letter lower case "s." Of course, the font designer can do the same type of design work for all the other letters of the alphabet, including numerals and other "standard" characters of the ASCII character set, as well as types of any other characters that may be desired, such as em-dashes or en-dashes, or other symbols such as a registered trademark symbol or a copyright symbol, etc.

Every type of character can have whatever attributes the font designer desires, which can have a font size associated with it, as well as the specific bitmap (or vector image) shape, and each of these individual variations will be referred to as a "subfont" for that particular character in this particular font set. Each of these subfonts will be used later by the executable software of the present invention to generate words that use such alphabet characters, and the system software of the present invention will select the appropriate subfont for each character for each word to be processed; this will either be an automatic selection or a manual selection, depending upon other choices made by the font designer, to be discussed below.

Figure 4:
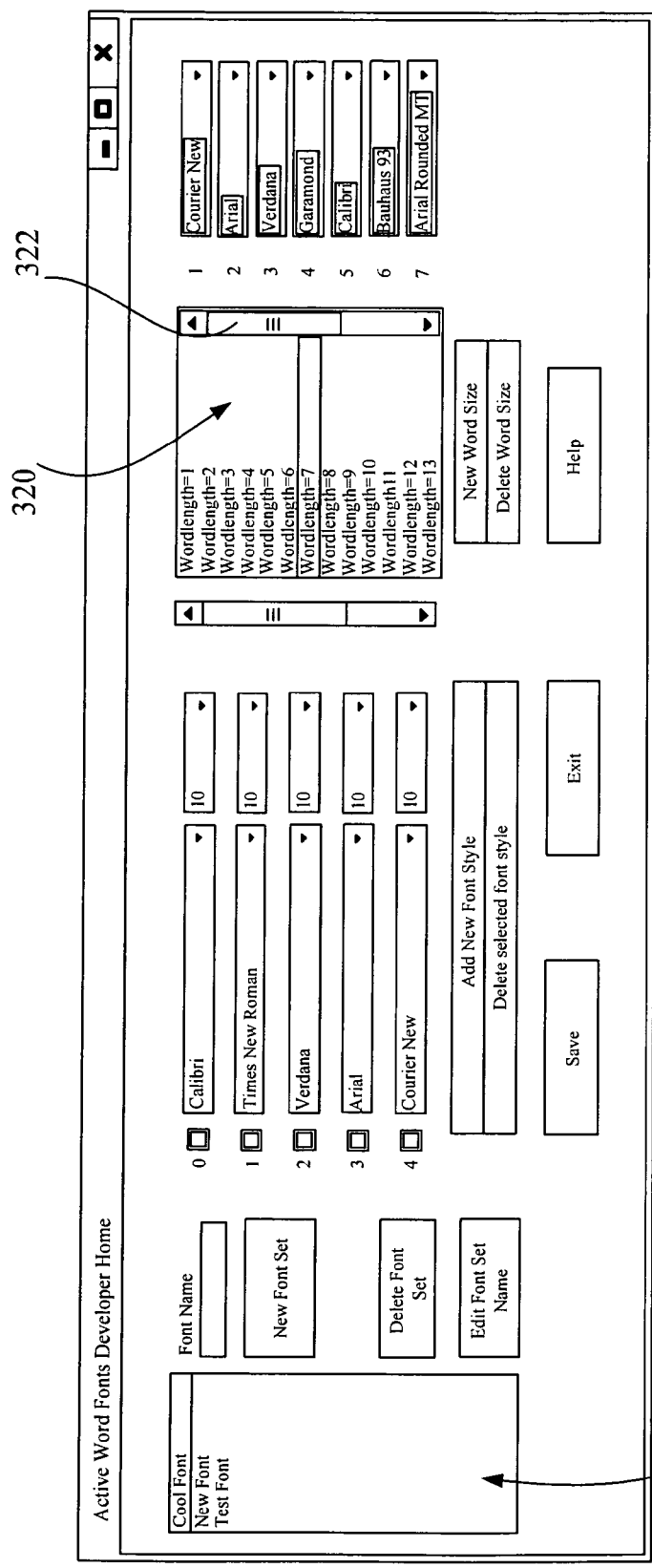
FIG. 4 is an example display screen that allows a font designer/developer to select the sizes and styles for each subfont that will be used in words of various word length, and character position within that word length.

At step 130, the subfonts per character are defined by the font designer based on a "word type" having a predetermined word length. The font designer can work using a display screen such as that depicted on FIG. 4. Referring now to FIG. 4, the font name can be selected as part of a new font set or editing an existing font set, and the active font name will be displayed in a panel 310 along the left-hand side of this display window. The length of the word type is selected using a panel 320 near the right-hand portion of this window, and for each word length, the font designer is to select a particular subfont to be used for each character for that size of word. For example, if this word type has a word length of one ("1") then the font designer can pick a subfont name and size for the only character in that size word length. In the example window of FIG. 4, that word length of one (1) could be Arial, at a point size of ten (10).

If the length of the word type is two ("2"), then the subfont for the first letter could be one particular subfont style and point size, and the second letter could be a different subfont style and point size. Again, these attributes would be selected on this screen of FIG. 4 by the font designer. On FIG. 4, there are word types having lengths up to thirteen (13) characters in size in panel 320, but of course longer words could be defined. This is apparent by showing a control bar 322 along the right side of the word length panel 320 on the GUI screen of FIG. 4.

At this point in using the control algorithm of the Active Word Font routine of the present invention, the font designer will need to understand the categories of subfont styles to be used in word types of various lengths. An advanced character set could include any number of subfonts, such as, for example, seven times the font structure that is offered by standard character fonts that are available at the present time. In this example, instead of a single type of font for a specific type of character (such as the uppercase S of 10-point Arial font), there will be seven (7) different subfonts for that particular font set and that particular point size character. Each of these seven (7) different subfonts would have a somewhat different vector image (or bitmap) pattern for that same character of that same point size. These seven (7) different subfonts would be selected for different characters of letters within words. The categories of different types of letters in a word (or "word type") can be defined as follows:

The advanced character set offers a separate design for the first character (Starting Character), the next few letters (Entrance Characters), the near-center characters (Middle-Entrance Characters), the center character (Key Character), followed by near center characters again (Middle-Trail Characters), followed by near final characters (Trail characters), and finally the last character (Last Character). Shorter words do not include all character structures, and longer words will include more than one entrance, middle, and trail characters.

As noted above, one of the benefits of using the present invention is to create an Active Word Font routine in which the software assigns a subfont to each letter of a word, resulting in a more readable font for that word to increase its legibility and its reading speed. Part of this is to use either block serifs or flowing serifs at appropriate locations in words to guide the eye of the reader. A "block serif" helps the reader find the beginning and the end of words within a sentence. A "flowing serif" helps the reader to more quickly read through the letters of a word, but one potential problem is that the use of a flowing serif at a starting character or a final character of a word might cause the reader to jump into the next word without realizing it, thereby decreasing the legibility for reading the sentence. One of the important principles of the present invention is to plan appropriate use of block serifs and flowing serifs for the various categories of characters used in words. This is only a portion of the usefulness of the present invention, although it is an important portion.

As noted above, in a preferred mode of the present invention, seven (7) different subfonts are made available to define a particular font set. However, a greater number or a lesser number of subfonts could be used by the font designer, while remaining within the principles of the present invention. Of course, if a greater number than seven (7) subfonts is used, more memory space will be needed. However, this is a design choice by the font designer, and the present invention allows for this. A smaller number than seven (7) subfonts can also be used, which would save memory space, but would also decrease the number of choices that are then made available to the Active Word Font software package, and thus it may decrease the legibility and readability of the words created by the subfonts in that character set. This again is a design choice by the font designer.

Referring back to the flow chart of FIG. 2, once the subfonts have been defined based upon the word length at step 130, a decision step 140 determines whether or not this particular word is to be on the "exception list." If the answer is YES, the logic flow is directed to a step 142 that inputs this new word to the exception list. Once a word is on the "exception list," then the Active Word Font routine will not automatically analyze and then select the subfonts for that word; instead, when that word is found in a document, then the word will be directly taken from the exception list and displayed with the predetermined subfonts.

If the word is not on the exception list, then the logic flow travels from the decision step 140 to a step 132 and certain characteristics are now input to the system, including the base size and subfont style for each character for a defined word length. This is part of the display screen of FIG. 4, and is determined by the font designer when using the Active Word Font system.

The term "Base Size" as used in step 132 refers to a particular font point size, and each subfont will have a particular point size that will be saved as a differential number with respect to the base size. An example will help simplify this explanation: if the font point size for a particular subfont is ten (10), this means that the familiar point size for a "Courier" font character would be referred to as "Courier Font Size 10." Assuming this is one of the assigned subfonts, if the base size is also ten (10), then the base size differential for that subfont would be zero (0). On the other hand, if a different subfont for that same character is to be a point size eleven (11), then the differential size would be "+1." In a similar fashion, if a subfont is to have an eight (8) point size, then its differential size would be "−2." In this way, the font designer can initially select a particular font size as the "base size" and that point size will be selected for a particular subfont for each letter the font designer wishes to create at that exact font point size. Each of the other subfonts will be generated as differential numbers compared to that base size; this methodology will take less memory size, and will also permit the font designer to more readily see what he or she is doing with regard to creating subfonts with respect to the original "base size." Naturally, this base size characterization is a matter of convention, and the actual point size for each subfont could instead be used, in which the font style for each character could have its defined size listed exactly as being that numeric point size, rather than a differential number compared to a base size. All of these possibilities are contemplated by the inventor.

After the base size and font style for each character has been input, the font set is saved at a step 134. This is also true for a word that has been added to the exception list at step 142.

Once the font set has been saved, a step 150 now saves the *.awf files in a serialized format in the "define" directory on the computer platform. The logic flow now is directed to a step "A" which is also found on the flow chart of FIG. 3.

Once the set of subfonts has been created, then those subfonts can be used on a computer platform to display various characters in a more readable fashion. In this mode, the "AWF" routine will be executed as "Add-in Logic" that inserts words into a display. The type of executable programs that could be used in conjunction with the Active Word Fonts include word processors and spreadsheets (e.g., Microsoft Word and Microsoft Excel), as well as other types of image software, including computer aided drafting (CAD) software, publishing software and graphic design software (e.g., Adobe In Design and Adobe PhotoShop).

Figure 3:
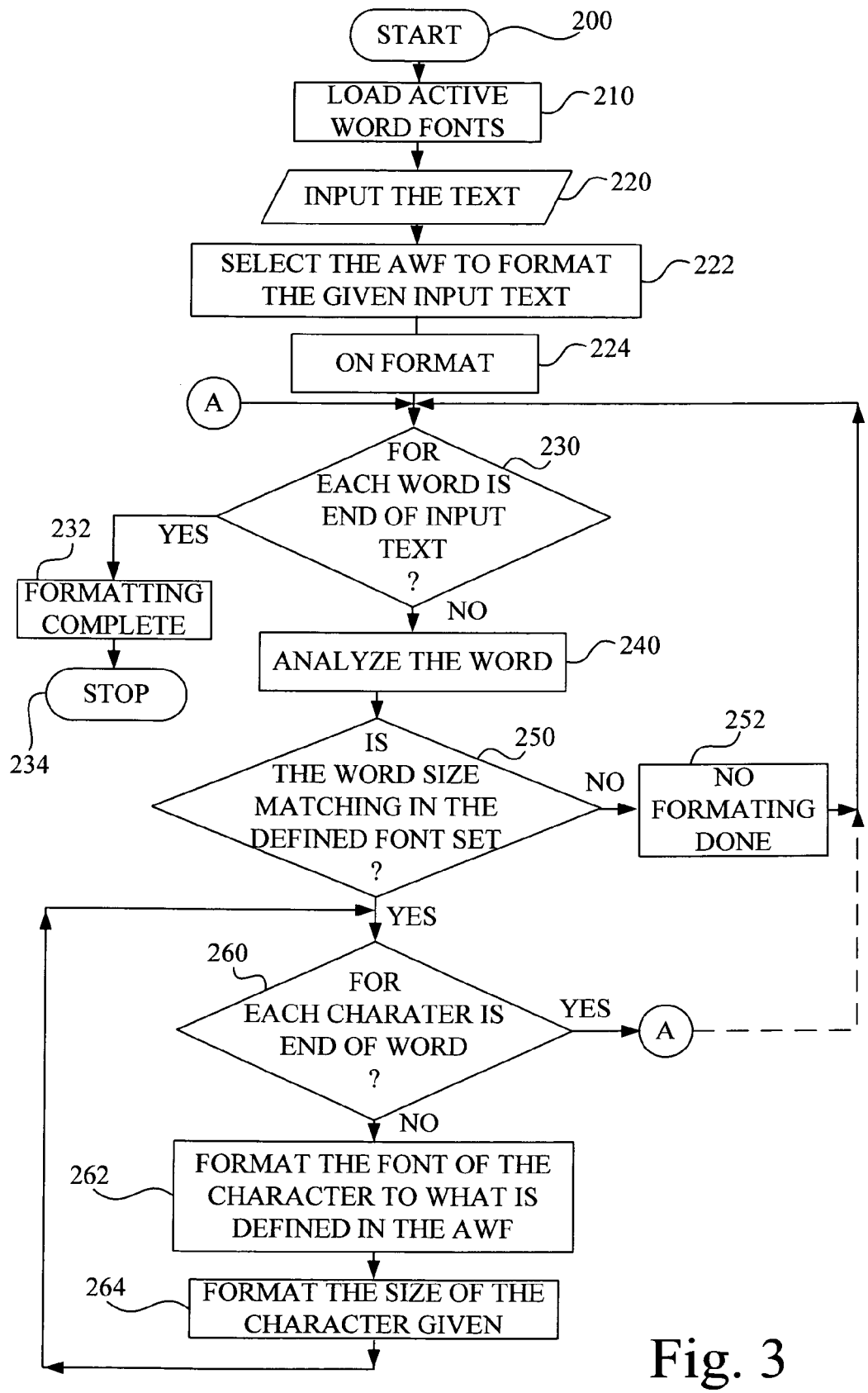
FIG. 3 is a flow chart of the steps used by "add-in logic" in which the subfonts created in FIG. 2 are used by executable software for inserting words into a display (or possibly a printout), according to the principles of the present invention.

Referring now to FIG. 3, the Add-in Logic is depicted in the form of a flow chart. Beginning with a start step at reference numeral 200, the next step loads the Active Word Fonts routine (i.e., the AWF "Add-in Logic") at a step 210. This loads the *.awf data files that have been previously defined in the flow chart of FIG. 2. The text is now input at a step 220. This could be text that is now manually entered by a computer user, or it could be text that was previously saved on that platform, or perhaps text that has been downloaded from another computer, such as via the INTERNET.

The next step is 222, in which the user can select a desired font set for this document which will read the appropriate *.awf file. This is similar to a user of a conventional word processor selecting a specific font style, such as Times New Roman, or Arial, or Courier for a particular paragraph of a word processing document. Instead of using one of the conventional fonts, by selecting a *.awf file, the user is selecting a set of subfonts that has been previously saved in a font data file. Some of these subfonts may have similarities to conventional fonts, or they could even be based exactly on conventional fonts, if desired.

Note that, in a preferred form of the invention, the subfonts are stored in separate files created by a font designer, and the selected *.awf file calls the specified subfonts as needed, from the appropriate font data files. This system configuration could be altered, if desired, so that a "compiled" version of a *.awf file is provided, and in this instance, the desired subfonts could be generated from data tables that are part of the "compiled"*.awf file. This alternative system configuration might execute faster, if that is desired for a specific computer application, but the preferred form (more or less an "interpreter" mode) probably is more flexible to use. With the high speed processors and memory storage devices available today, either system mode will likely be quite adequate, and real time executable throughput timing will not be an issue.

At a step 224, the user now selects a "format" button on the active display (on monitor ZZ1), which starts the analytical process by which the Active Word Fonts are used on this computer platform. The *.awf files that were saved in step 150 of FIG. 2 are now made available at Step "A", which now appears at this point in the process on the flow chart of FIG. 3. These AWF font sets are brought into play after the format command has been selected at step 224, and the logic is then directed to a step 230.

At decision step 230, the control logic determines if the current word is at the end of the input text. If the result is YES, then a step 232 completes the formatting of this document, and the logic flow is directed to a "STOP" step at 234.

If the result was NO at step 230, then the logic flow is directed to a step 240 which analyzes the input word. Step 240 is a complex step, which counts the number of characters in this input word being analyzed, to determine which set of previously-assigned subfonts styles and sizes is to be used (based on the word type, which depends on the number of letters in the input word). In addition, the input word is checked to see if it is on the exception list. If the input word is not on the exception list, then this word shall be processed (formatted), according to the particular set of subfonts that were defined in step 130 on the flow chart of FIG. 2 for the appropriate number of characters in this word type. As described above, each of the characters will be categorized, and a particular style of subfont (which has already been assigned by the font designer including the point size) will be now used for each character position of this word type.

Once the word has been analyzed, and the particular subfont has been determined for each character position of the word, then a decision step 250 determines if the word length matches in the defined font set. This is an "anti-crash" routine that is not truly necessary for the operations of the present invention, but is more necessary for preventing the WINDOWS-type platform software from crashing if there is a mis-match in word length. If the result is NO at a step 250, then the control logic is directed to a step 252 and no formatting is performed at all for this word. Instead, the logic flow is directed back to the step "A" to decision step 230. Otherwise certain platforms might literally crash, which would be an unfortunate result and would terminate processing of this document. Instead, step 250 prevents that from occurring, and only if the word length matches in the defined font set will formatting be performed.

If the result is YES at step 250, then a decision step 260 determines if the character being formatted is at the end of a word. If the answer is YES, then the logic is directed to step "A", which is also in other locations on this same flow chart of FIG. 3. In other words, the logic flow is directed back to the decision step 230.

If the result was NO at step 260, then a step 262 formats the font of the character to what has been defined in the *.awf file. That particular letter of the word will be formatted to the subfont that has been previously defined in the *.awf file. A step 264 now formats the point size for this particular subfont. This is where the differential point size value comes into play. For example, if the subfont should be a point size eleven (11), and if the base font size was ten (10), then the character size at step 264 would be defined as a numeric value "+1" (rather than a numeric value of eleven).

Once the subfont has been selected and its size has been defined at steps 262 and 264, the logic flow is directed back to step 260, which determines if the character next to be processed is at the end of a word. As noted above, if the answer is YES, the logic flow is directed back to step "A", and then decision step 230 determines whether the word that has been formatted is at the end of the input text. If YES, then formatting has been completed for this text and the processing stops at step 234.

The above description of the invention has concentrated on "printed" text which, in the main, is artificially created by a font designer (which can include "script"—type fonts). However, the present invention also can be used to display or print handwriting, in which a person's actual handwriting could be the basis of a new set of subfonts. If actual handwriting is to be displayed or printed, the present invention is able to more accurately portray that handwriting.

Additional functions (processing steps) are required if a person's actual handwriting is to be the basis of a new set of subfonts. Several handwriting samples need to be imaged, so that a rendered set of bitmaps can be initially created for each desired character, including (uppercase and lowercase) letters, numbers, and punctuation marks that will be part of the set of subfonts. The bitmaps can be rendered into vector images, if desired. A font designer will then need to decide which exact renderings will be used to determine which (or if) particular characters having a variety of small shape differences will be used for each specific subfont. For example, the same handwritten letter (such as a lower case "a" or a lower case "o") will have a very different appearance if that letter is used at the beginning of a word versus at the end of a word. The *.awf files can portray such differences by using the appropriate subfonts for each letter, for such various character locations within words. In this manner, the text that is later displayed or printed will exhibit a "natural" look, as opposed to artificially-created script-type fonts.

A person's handwriting images can be input via an optical scanner, perhaps using printer 36, which then would comprise a printer/scanner device, such as an "all-in-one" printer that is well known in the art. After all of this information becomes available in the computer system that is being used by the font designer, then the procedure described above in the steps of FIG. 2 now is implemented. However, the various subfonts will not be artificially created (e.g., "printed") font styles, but instead will be based on a particular person's actual handwriting samples.

It will be understood that the features of the present invention that allow handwriting to be used for generating subfonts can be based on a composite set of handwriting samples of more than one person, if desired. The font designer will always be able to create virtually any specific shapes and sizes of written characters, whether such characters are based on existing or new printed font styles, or are based on the handwriting of either a single person, or a composite of several persons. The font designer further can create an entirely new style of subfonts that are entirely arbitrary, and still remain within the principles of the present invention.

To sum up some of the important features of the present invention, a new software tool provides a way to define new subfonts. In one form, existing fonts can be used to create a new set of subfonts, for example, using the existing set of fonts which are provided as a part of Microsoft Word. This new software tool has two major parts: (1) an "Active Word Fonts" Developer tool, for use by font designers; and (2) an "Active Word Fonts" Add-in Logic module that can be used with a word processor computer program, such as Microsoft Word, by virtually any PC user.

When using the Active Word Fonts Developer, the following terminology can be useful:

"Font Sets"—these are created with the AWF Developer tool, for example, using existing fonts provided by Microsoft word along with the existing sizes (i.e., the point size). However, a font designer can create his or her brand new set of fonts, if desired. Every Font Set is defined with the following characteristics:
1. Font Name
2. Base Size
3. Word Sizes "Font Name"—this can be virtually anything imagined by the font designer/developer, including the existing Font names that are already present in a standard word processor computer program, such as Microsoft Word.

"Base Size"—as described above, this is selected by the font designer/developer, and is selected as a reference "point size" of a particular font set, to be used in creating the subfonts of various point sizes. This variable is typically set to ten (10).

"Word Sizes"—for each Word size, certain behavioral characteristics are defined, as described above.

To create a new Font Set, the following steps occur:
1. Open Active Word Font Developer.
2. Create New Font Set.
3. Define the Fonts and the Base Size for each Font.
4. Select the Word length.
5. For each word, select fonts from the drop down box for every letter.
6. After all the words are defined save the file.

As an example, a new font named "Cool Font" is created using the AWF Developer, which can have the following Fonts and Base Sizes to define the subfonts:

| No. | Font Name | Base Size |
|---|---|---|
| 1 | Calibri | 16 |
| 2 | Times New Roman | 10 |
| 3 | Verdana | 12 |
| 4 | Arial | 14 |
| 5 | Courier New | 16 |
| 6 | Comic Sans MS | 12 |
| 7 | Garamond | 14 |

Continuing this example, the Fonts selected for the Font Set are defined for each word size; that is, each letter position for each word size is defined. For example:

| | | |
|---|---|---|
| Word Length 1 | Arial | (letter position 1) |
| Word Length 2 | Verdana | (letter position 1) |
| | Garamond | (letter position 2) |
| Word Length 3 | Garamond | (letter position 1) |
| | Comic Sans | (letter position 2) |
| | Garamond | (letter position 3) |
| Word Length 4 | Arial | (letter position 1) |
| | Comic Sans MS | (letter position 2) |
| | Verdana | (letter position 3) |
| | Garamond | (letter position 4) |
| Word Length 5 | Courier New | (letter position 1) |
| | Arial | (letter position 2) |
| | Verdana | (letter position 3) |
| | Garamond | (letter position 4) |
| | Calibri | (letter position 5) |
| Word Length 6 | Calibri | (letter position 1) |
| | Verdana | (letter position 2) |
| | Times New Roman | (letter position 3) |
| | Times New Roman | (letter position 4) |
| | Comic Sans MS | (letter position 5) |
| | Courier New | (letter position 6) |

It will be understood that the above example is merely a single possibility of using existing fonts with the present invention to define a series of subfonts for use in displaying (or possibly printing) verbal text as a series of font characters that form words from an alphabet of possible characters. Moreover, the above example used only existing fonts to define the subfonts, whereas the present invention also envisions creation of entirely new fonts, when desired by the font designer/developer. Certain new character fonts (or subfonts) might have similarities to existing font characters, but there are many, many possible variations that can be used to differentiate between an existing font character and an entirely new font character.

With regard to the steps performed by the processing engine (e.g., the microprocessor 22 at PC 20) to execute the Add-in Logic described in the flow chart of FIG. 3, a summary of these logic steps follows:
1. User Input.
2. Analyze the input.
3. Format the text.
4. Repeat till the end of input.

More specifically, at the "User Input" step, the user inputs the text with his/her own sizes and fonts of varying length words. As an example, consider the sentence:

The result of the battle was seized upon by the press.

In the above example, user defined a sentence containing eleven (11) words of varying word lengths and varying fonts.

More specifically, at the "Analyze the Word" step, the system finds the length of each word and then processes the word. In the first sub-step, each letter in the word is changed to the appropriate font defined in the Font Set.

For example, BIG is changed to BIG.

This change in the subfonts is carried out as defined for three-letter words in the Font Set. In the example above, this would be as follows:

Letter 1—Garamond
Letter 2—Comic Sans MS
Letter 3—Garamond

In the second sub-step, each letter Font Size is changed according to the predetermined routine, in which there are four considerations when evaluating the size of the word:

1. —Base Size (=10).
2. —Developer Selected Size.
3. —Selected Size (X).
4. —Evaluated Size ("Displayed" Size).

In this example, the following table gives the "Evaluated Size" for new "Developer Selected Sizes:"

| DEVELOPER SELECTED SIZE | EVALUATED (displayed) SIZE |
| --- | --- |
| 8 | X − 2 |
| 9 | X − 1 |
| 10 | X |
| 11 | X + 1 |
| 12 | X + 2 |
| 14 | X + 4 |
| 16 | X + 6 |
| 18 | X + 8 |
| 20 | X + 10 |
| 22 | X + 12 |
| 24 | X + 14 |
| 26 | X + 16 |
| 28 | X + 18 |
| 36 | X + 26 |
| 48 | X + 38 |
| 72 | X + 62 |

In one mode of the present invention, the displayed size is calculated according to the equation:

$$\text{Displayed Size} = [(\text{Developer Selected Size} - \text{Base Size}) + \text{User Selected Size}].$$

For example, if the User Selected Size for the first character of the word "BIG" (i.e., the letter "B") is twenty (20), and if the Developer Selected Size was fourteen (14), then its Displayed Size is calculated as [(14−10)+20]=24, and hence: BIG appears as BIG In the above specific example, for the size of each letter of the word BIG:

Letter 1: Size 24
Letter 2: Size 22
Letter 3: Size 24

More specifically, at the "Format the Text" step, the given text is formatted based on the logic above. This routine repeats until the end of selected text is reached, or the end of document is reached, depending on the choice selected by the user. For example, when the below text is formatted it would result in the following:

Before Formatting:
The result of the battle was seized upon by the press.
After Formatting:
The result of the battle was Seized upon by the press It will be understood that the above example is provided to illustrate some of the logical operations used in the present invention, and is not meant to illustrate a preferred choice of subfonts for the text that was used in the example. Certainly a more refined set of subfonts could have been selected; however, this example does serve to better illustrate the types of changes that occur when using the principles of the present invention on actual English language text.

It will also be understood that the logical operations described in relation to the flow charts of FIGS. 2 and 3 can be implemented using sequential logic, such as by using microprocessor technology, or using a logic state machine, or perhaps by discrete logic; it even could be implemented using parallel processors. One preferred embodiment may use a microprocessor or microcontroller (e.g., microprocessor 22) to execute software instructions that are stored in memory cells within RAM and executable ROM. The software instructions could first be stored on a bulk memory storage device, such as a hard disk drive, or an optical disc drive, and then loaded into the RAM. Of course, other types of circuitry could be used to implement these logical operations depicted in the drawings without departing from the principles of the present invention.

It will be further understood that the precise logical operations depicted in the flow charts of FIGS. 2-3, and discussed above, could be somewhat modified to perform similar, although not exact, functions without departing from the principles of the present invention. The exact nature of some of the decision steps and other commands in these flow charts are directed toward existing and future models of personal computers, and certainly similar, but somewhat different, steps might be taken for use with other types of computer systems in many instances, with the overall inventive results being the same.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed, and the present invention may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for using a plurality of subfonts to represent verbal characters, said method comprising:
   (a) providing a processing circuit with a memory circuit;
   (b) providing at least one input device interfaced with said processing circuit;
   (c) providing at least one output device interfaced with said processing circuit;
   (d) determining a plurality of subfont styles and sizes, for use in defining a first active word font set;
   (e) selecting a desired subfont for each character of a plurality of word types having various word sizes, in which a "word size" comprises a number of characters of a word, by:
      (i) assigning, for a first word size, from said plurality of subfont styles and sizes, a desired subfont style and size for each character position within said first word size;
      (ii) assigning, for a second word size, from said plurality of subfont styles and sizes, a desired subfont style and size for each character position within said second word size;
      (iii) continuing said subfont style and size assigning functions for additional word sizes, until reaching a predetermined maximum word size;
   wherein a first at least one of said subfont type and size of a first character position is different from a second at least one of said subfont type and size of a second character position for at least one of said first, second, and additional word sizes; and
   (e) storing said assigned subfont styles and sizes for each of the plurality of word types in said memory circuit as said first active word font set, for later retrieval.

2. The method of claim 1, wherein said step of determining a plurality of subfont styles and sizes includes selecting an existing font style to be used as at least one of said subfont styles in said first active word font set.

3. The method of claim 1, wherein said step of determining a plurality of subfont styles and sizes includes creating a new font style to be used as at least one of said subfont styles in said first active word font set.

4. The method of claim 1, wherein said step of determining a plurality of subfont styles and sizes utilizes at least one of: (a) artificially-created printed fonts, (b) artificially-created script fonts, and (c) handwriting.

5. The method of claim 1, wherein said steps of assigning, from said plurality of subfont styles and sizes, a desired subfont style and size for each character position within one of said word sizes uses predefined categories of letter positions, and a single word may have more than one character position using the same predefined category of letter position.

6. The method of claim 5, wherein said predefined categories of letter positions for a word type comprise at least the following types of categories:
   (a) "Starting Character" for the first character position;
   (b) "Entrance Characters" for at least one of the next few character positions;
   (c) "Middle-Entrance Characters" for at least one near-center character position;
   (d) "Key Character" for the center character position;
   (e) "Middle-Trail Characters" for at least one following near-center character position;
   (f) "Trail Characters" for at least one near final character position; and
   (g) "Last Character" for the last character position;
   and wherein a word type having less than seven character positions will not include each of the above predefined categories of letter positions.

7. The method of claim 1, further comprising the step of creating an exception list, wherein at least one predetermined word has specific subfont styles and sizes exactly assigned for each character position, and thus said at least one predetermined word is placed into said exception list, which becomes part of said first active word font set.

8. The method of claim 1, further comprising the steps of:
   (f) determining a second plurality of subfont styles and sizes, for use in defining a second active word font set;
   (g) selecting a desired subfont for each character of a plurality of word types having various word sizes, in which a "word size" comprises a number of characters of a word, by:
      (i) assigning, for a first word size, from said second plurality of subfont styles and sizes, a desired subfont style and size for each character position within said first word size;
      (ii) assigning, for a second word size, from said second plurality of subfont styles and sizes, a desired subfont style and size for each character position within said second word size;
      (iii) continuing said subfont style and size assigning functions for additional word sizes, until reaching a predetermined maximum word size;
   wherein a first at least one of said subfont type and size of a first character position is different from a second at least one of said subfont type and size of a second character position for at least one of said first, second, and additional word sizes; and
   (h) storing said assigned second subfont styles and sizes for each of the plurality of word types in said memory circuit as said second active word font set, for later retrieval.

9. The method of claim 1, wherein said at least one input device comprises at least one of: a character input device, and a cursor position pointing device.

10. The method of claim 1, wherein said at least one output device comprises at least one of: a display, and a printer.

11. A method for retrieving a plurality of subfonts that represent verbal characters for use with text data, said method comprising:
   (a) providing a processing circuit with a memory circuit;
   (b) providing at least one input device interfaced with said processing circuit;
   (c) providing at least one output device interfaced with said processing circuit;
   (d) providing an active word font set that includes:
      (i) a plurality of predetermined word types of various word sizes, in which a "word size" comprises a number of characters of a word;
      (ii) a plurality of previously-assigned subfont styles and sizes for each of said plurality of word types;
   (e) receiving input text data to be formatted using said active word font set, wherein said input text data includes a plurality of words having verbal characters; and
   (f) analyzing each of said plurality of words of said input text data received in step
   (e), by determining if each of said input words matches one of said word types, and:
      (i) if not, then performing no formatting on that input word;
      (ii) if so, then formatting each character of that input word, by:

(A) determining a word size of said input word, and retrieving a corresponding set of said plurality of previously-assigned subfont styles and sizes for that word size; and (B) formatting each character of said input word, based upon a character position within said input word, and using said corresponding set of said plurality of previously-assigned subfont styles and sizes for that character position in the corresponding word size;

wherein a first at least one of said subfont type and size of a first character position is different from a second at least one of said subfont type and size of a second character position for at least one of said plurality of words of the input text data.

12. The method of claim 11, wherein: the step of formatting each character of said input word comprises:

(a) if the previously-assigned subfont style for a particular character position is different than a font style of that same character position of said input word being formatted, then altering said font style of that character to the appropriate previously-assigned subfont style; and (b) if the previously-assigned subfont size for a particular character position is different than a font size of that same character position of said input word being formatted, then altering said font size of that character to the appropriate previously-assigned subfont size.

13. The method of claim 12, wherein: the step of formatting a particular character position subfont style and size is performed for all characters of said input word, and this results in an output word that has an appearance of one of: (a) artificially-created printed fonts, (b) artificially-created script fonts, and (c) handwriting.

14. The method of claim 12, wherein: the step of formatting a particular character position subfont style and size is performed for all characters of said input word, and this results in an output word that is more easily readable than that of the original font style of said input word.

15. The method of claim 11, further comprising the step of determining whether a specific word resides in an exception list that contains at least one predetermined word having at least one specific subfont style and size exactly assigned for each character position of that word, and if said specific word is found in said exception list, then that specific word does not undergo said analysis processing upon retrieval.

16. The method of claim 11, wherein: the step of receiving input text data to be formatted comprises one of:

(a) retrieving data from a file previously stored in said memory circuit; and (b) entering data in real time by use of said at least one input device.

17. The method of claim 11, wherein said at least one input device comprises at least one of: a character input device, and a cursor position pointing device.

18. The method of claim 11, wherein said at least one output device comprises at least one of: a display, and a printer.

* * * * *